United States Patent
Johnson

(10) Patent No.: US 9,504,902 B1
(45) Date of Patent: Nov. 29, 2016

(54) SKATEBOARD BRAKING SYSTEM

(71) Applicant: Wellesley Johnson, Los Angeles, CA (US)

(72) Inventor: Wellesley Johnson, Los Angeles, CA (US)

(73) Assignee: Wellesley Johnson, Los Angeles, CA (US)

( * ) Notice: Subject to any disclaimer, the term of this patent is extended or adjusted under 35 U.S.C. 154(b) by 0 days.

(21) Appl. No.: 14/723,445

(22) Filed: May 27, 2015

(51) Int. Cl.
A63C 17/14 (2006.01)
F16D 49/16 (2006.01)
B60T 7/04 (2006.01)

(52) U.S. Cl.
CPC ............ A63C 17/14 (2013.01); F16D 49/16 (2013.01); A63C 2017/1463 (2013.01); B60T 7/04 (2013.01)

(58) Field of Classification Search
CPC ...... A63C 17/14; A63C 17/00; A63C 17/01; B62K 3/002; F16D 49/16
See application file for complete search history.

(56) References Cited

U.S. PATENT DOCUMENTS

| | | | | |
|---|---|---|---|---|
| 1,336,909 A * | 4/1920 | Lockard | F16D 49/16 | 188/12 |
| 1,336,956 A * | 4/1920 | Haney | F16D 49/16 | 188/12 |
| 3,288,251 A * | 11/1966 | Sakwa | A63C 17/01 | 188/29 |
| 4,027,890 A * | 6/1977 | Volkmann | A63C 17/01 | 188/2 R |
| 4,084,831 A * | 4/1978 | Akonteh | A63C 17/01 | 188/29 |
| 4,166,519 A * | 9/1979 | Maloney | A63C 17/01 | 188/2 R |
| 6,213,484 B1 * | 4/2001 | Rohner | A63C 17/01 | 280/87.042 |
| 6,659,480 B1 * | 12/2003 | Newman | A63C 17/01 | 188/74 |
| 6,767,265 B2 * | 7/2004 | Gamble | A43B 5/08 | 428/100 |
| 6,820,881 B1 * | 11/2004 | Berry | A63C 17/01 | 180/20 |
| 7,314,223 B2 * | 1/2008 | Lin | A63C 17/01 | 280/11.214 |
| 7,597,333 B2 * | 10/2009 | Stillinger | A63C 17/012 | 280/87.01 |
| 8,371,594 B2 * | 2/2013 | Palmer | A63C 17/01 | 280/11.215 |
| 8,500,136 B2 * | 8/2013 | Palmer | A63C 17/01 | 280/11.215 |
| 2005/0173879 A1 * | 8/2005 | Park | A63C 17/01 | 280/87.041 |
| 2006/0108753 A1 * | 5/2006 | Harnden | A63C 17/01 | 280/11.27 |
| 2010/0183814 A1 * | 7/2010 | Rios | E04F 15/02161 | 427/387 |
| 2015/0190704 A1 * | 7/2015 | McDowell | A63C 17/1418 | 188/24.11 |
| 2016/0107718 A1 * | 4/2016 | O Connell | B62L 3/04 | 280/87.041 |

* cited by examiner

Primary Examiner — J. Allen Shriver, II
Assistant Examiner — Brian Cassidy

(57) ABSTRACT

The present invention provides a braking system affixed to a skateboard having a board with a pair of truck assemblies affixed to an underside thereof. The braking system comprises a pivoting foot control lever semi-flush mounted on top of the skateboard deck, a master control mechanism and a brake actuator assembly which are affixed on the skateboard trucks. The foot control lever is operatively coupled to the master control mechanism and the master control mechanism is operatively coupled to the brake actuator assembly. The brake actuator assembly reduces the rotation of the wheels when a user applies a turning force on the foot control lever that activates a set of steel cables to turn the master control mechanism therefore releasing a pair of brake lever pads towards the wheels.

15 Claims, 6 Drawing Sheets

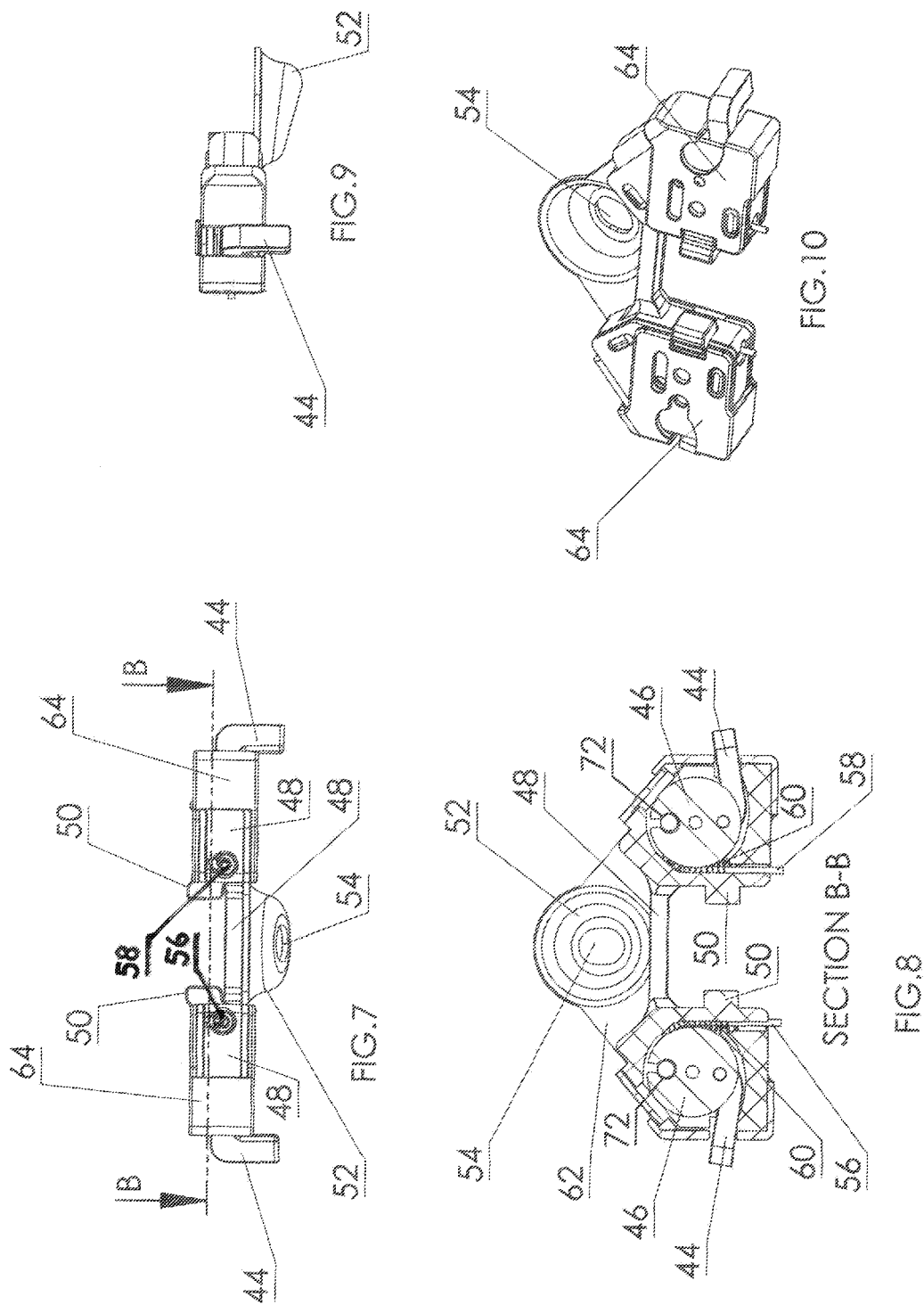

SKATEBOARD BRAKING SYSTEM

BACKGROUND OF THE INVENTION

1. Field of Invention

This invention relates to braking systems suitable for use with skateboards.

2. Description of the Related Art

There are any known braking devices for skateboards. The most common is the semi cylindrical shaped plastic affixed to the bottom rear portion of the skateboard deck. The latest braking devices are a skateboard truck (axle) with a built-in brake mechanism that reduces the rotation of the skateboard wheels when activated by a hand-held control lever or a foot control lever that protrudes above the top portion of the skateboard deck. Other types of braking devices include a mechanism affixed to the bottom of the skateboard deck that reduce the rotation of the wheels when activated by a foot control lever which protrudes above the top portion of the skateboard deck. All of the foot controlled brake devices require the user to press downward on a foot lever to perform a braking operation. These foot levers protruding above the board can hinder a users rideability.

However, there has not been a skateboard braking system that encompass a semi flush mounted pivoting foot controlled foot pedal to reduce the rotation of the skateboard wheels. In view of the above, it will be apparent to those skilled in the art from this disclosure that there exists a need for an improved braking system. This invention addresses this need in the art as well as other needs, which will become apparent to those skilled in the art from this disclosure.

BRIEF SUMMARY OF THE PRESENT INVENTION

The present invention provides a braking system affixed to a skateboard having a board with a pair of truck assemblies affixed to an underside thereof. The braking system comprises a pivoting foot control lever semi-flush mounted top of the skateboard deck, a master control mechanism and a brake actuator assembly which are affixed on the skateboard trucks. The foot control level is operatively coupled to the master control mechanism and the master control mechanism is operatively coupled to the brake actuator assembly. The brake actuator assembly reduces the rotation of the wheels when a user applies a turning force on the foot control lever that activates a set of steel cables to turn the master control mechanism therefore releasing a pair of brake lever pads towards the wheels.

DESCRIPTION OF THE SEVERAL VIEWS OF THE DRAWINGS

Other features and advantages of this invention will become apparent in the following detailed description of the preferred embodiments of this invention with reference to the accompanying drawings in which:

FIG. 7. is a rear view of the brake actuator assembly.

FIG. 8, is a cross sectional view along line B of FIG. 7 showing the components inside the brake actuator assembly.

FIG. 9. is a side view of brake lever pads and concave bracket of the brake actuator assembly.

FIG. 10. is a isometric view of brake actuator assembly.

Figure 1:
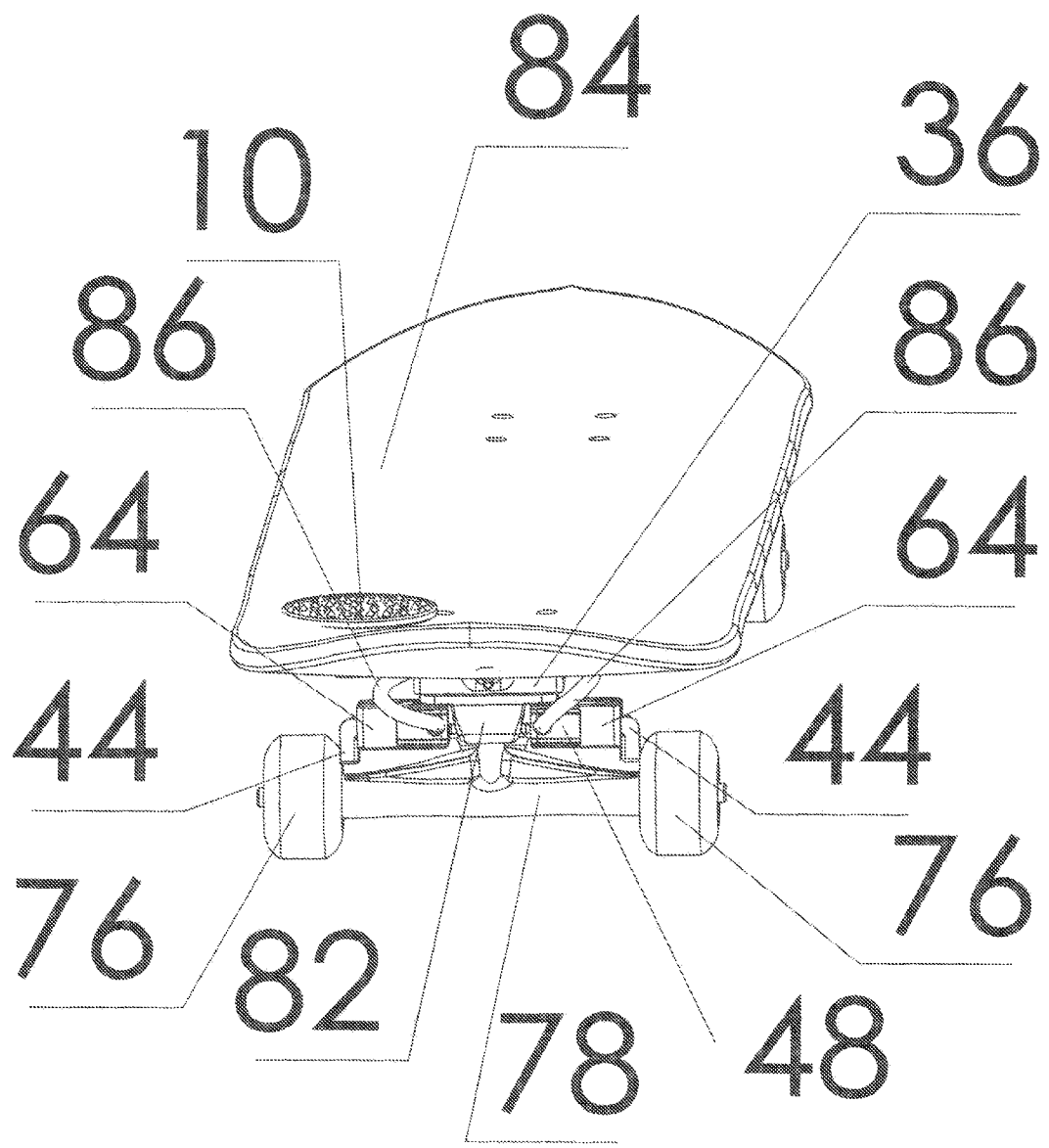
FIG. 1. is a rear view of the skateboard with the braking system affixed thereof.

REFERENCE NUMERALS IN THE DRAWINGS 10 foot plate
12 control lever
14 shaft
16 steel cable part
18 spikes
20 locking slider bar
22 mounting holes
24 button pin
26 main rotator
28 spring brace
30 spring A
32 spring B
34 spring C
36 base housing
38 steel cable part
40 steel cable part
42 steel cable part
44 brake lever pads
46 sub rotator
48 support brace
50 stabilizer
52 concave bracket
54 mounting hole
56 steel cable part
58 steel cable part
60 spring D
62 lockplate housing
64 protector cover
66 base housing cover
68 cable paths
70 cable connector
72 cable connector
74 cable connector
76 wheels
78 hanger(axle)
80 kingpin
82 baseplate
84 board
86 cable sheath

DETAILED DESCRIPTION

Selected embodiments of the present invention will now be explained with reference to the drawings. It will be apparent to those skilled in the art from this disclosure that the following description of the embodiments of the present invention are provided for illustration only and not for the purpose of limiting the invention as defined by the appended claims and their equivalents.

Figure 2:
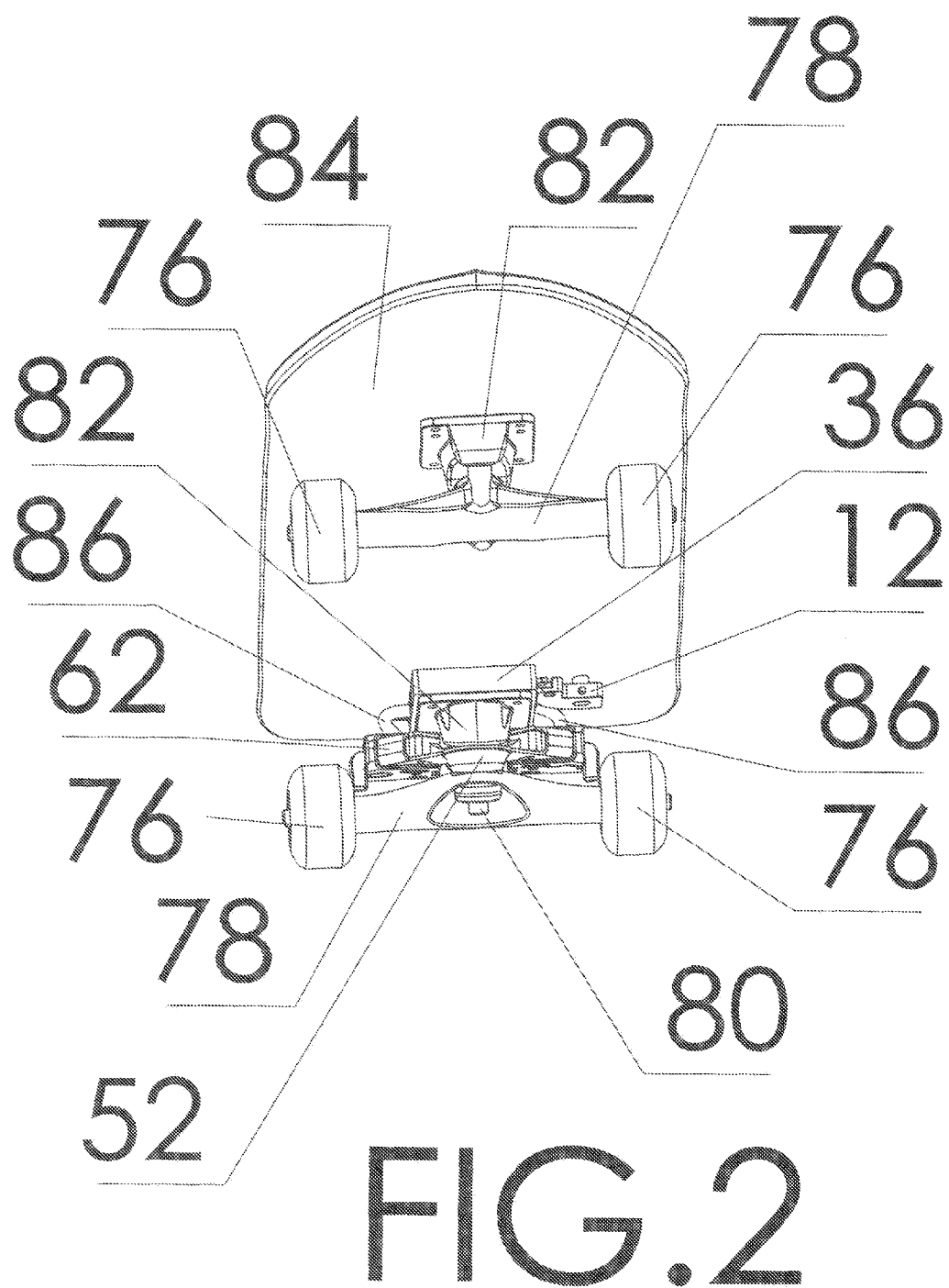
FIG. 2. is a underside view of the skateboard with the braking system affixed thereof.
Figure 11:
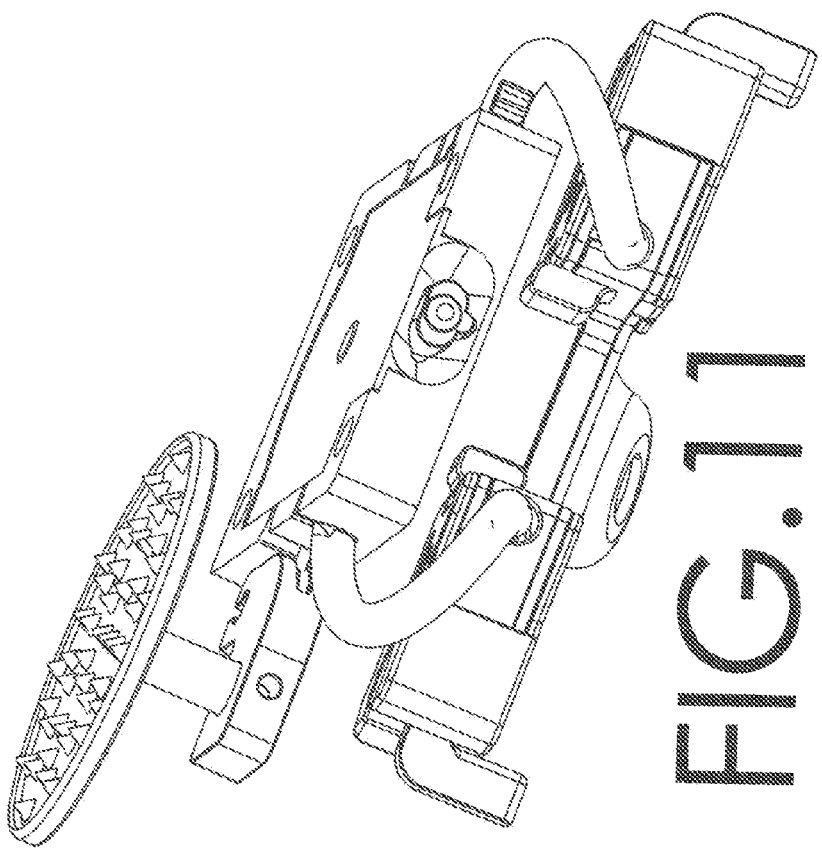
FIG. 11. Is a isometric view of he complete assembly of the braking system.

Referring initially to FIG. 1, a skateboard 84 is illustrated that is equipped with a braking system FIG. 11 in accordance with the first embodiment The skateboard 84 illustrated in FIG. 2 includes, among other things affixed to the underside, a pair of truck assemblies each comprising a pair of wheels 76 rotatably attached to a hanger(axle) 78, and a circular bushing (not shown) affixed over the kingpin 80, seated between the hanger 78 and the baseplate 82. The braking system can be attached to either front or rear truck assemblies.

Figure 3:
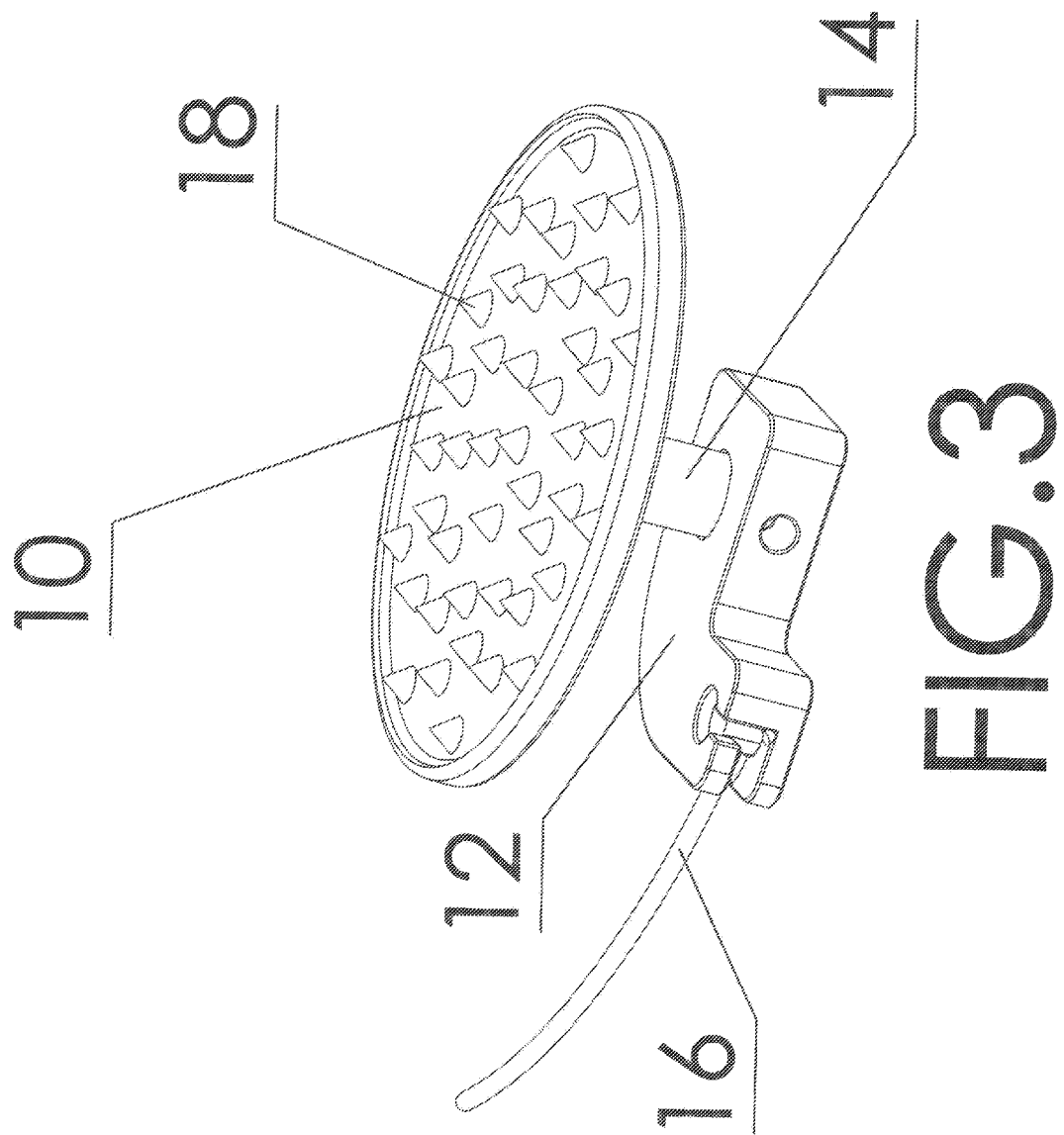
FIG. 3 is an isometric view showing the spikes atop the foot control lever.
Figure 4:
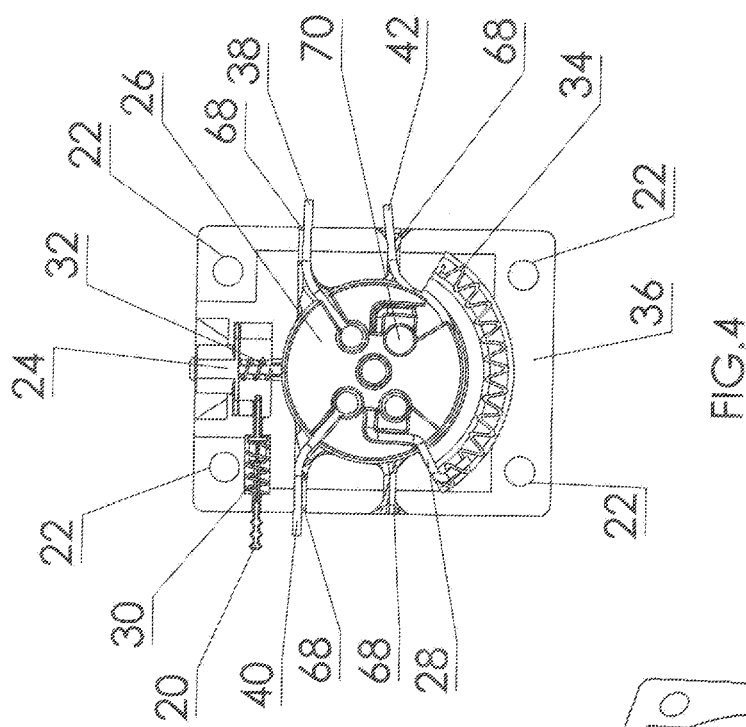
FIG. 4. is a top view o the master control mechanism showing its components.
Figure 6:
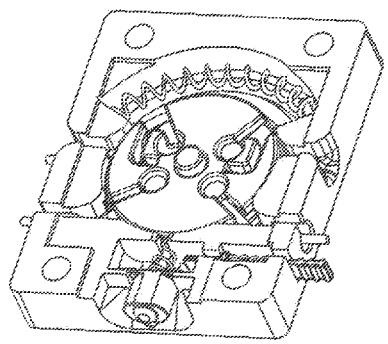
FIG. 6. is an isometric view of the master control mechanism.
Figure 5:
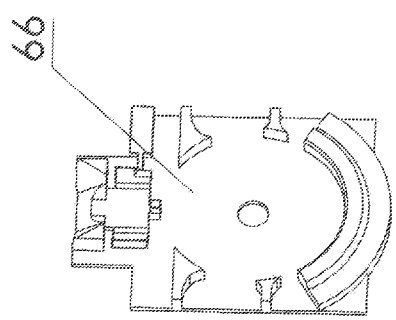
FIG. 5. is a bottom view of the base housing cover that encapsulates the components of the master control mechanism of FIG. 4.

A complete braking system shown in FIG. 11 comprises initially a foot control lever illustrated in FIG. 3 operatively coupled to a master control mechanism illustrated in FIG. 4-6 and operatively coupled to a brake actuator assembly illustrated in FIG. 7-10. Operatively coupled is described as using ball fittings on both ends of a steel cable to connect at least two parts. The foot control lever FIG. 3 comprises a grouping of spikes 18 atop a circular foot plate 10 for the user's foot to have a firm placement to rotate the of control lever FIG. 3 in a braking operation. The foot control lever FIG. 3 is attached though a hole (not shown) in the skateboard 84 adjacent to the base housing 36 FIG. 2 where steel cable part 42 is located FIG. 4. The shaft 14 passes through a circular hole in the skateboard 84 and is attached to the control lever 12. The control lever 12 is connected to the steel cable part 16. Steel cable part 16 joins steel cable part 42 of FIG. 4 essentially forming one cable which transmits a rotating pulling force to the main rotator 26 of FIG. 4. The pulling force rotates the main rotator 26 allowing another pulling force of steel cable part 38 and steel cable part 40 simultaneously. Steel cable part 38 joins steel cable part 56 of FIG 8 essentially forming one cable which transmits a pulling force to rotate the respective sub rotator 46 which releases the respective brake lever pad 44 to slow rotation of the adjacent wheel 76. Steel cable part 40 joins steel cable part 58 of FIG. 8 essentially forming one cable which transmits a pulling force to rotate the respective sub rotator 46 which releases the respective brake lever pad 44 to slow rotation of the adjacent wheel 76. The steel cable part 38 of FIG. 4 joined with steel cable part 56 of FIG. 8 is concealed in a outer cable sheath 86 shown in FIG. 1. Steel cable part 40 of FIG. 4 joined with steel cable part 58 of FIG. 8 is concealed in a outer cable sheath 86 shown in FIG. 1.

The master control mechanism FIG. 4 comprises initially a base housing 36 which contains a main rotator 26 rotatably attached. The main rotator 26 is a circular hub. The main rotator 26 and foot control lever FIG. 3 are set to recoil to a present position after a braking operation by a spring brace 28 and a spring C 34 affixed to the main rotator 26. The main rotator 26 comprises four cable connectors 70, two which operatively couples two sub rotators 46 by way of two steel cables. The master control mechanism FIG. 4 has a locking means to disable the braking application when the rider chooses. The locking means consists of a locking slider bar 20 in collaboration with spring A 30 and button pin 24 in collaboration with spring B 32 biased to the main rotator 26. The locking slider bar 20 can lock the button pin 24 in or out of engagement with the main rotator 26 via a slot (no shown) in the main rotator 26. The base housing 30 has four holes for securing the master control mechanism FIG. 4 between the baseplate 82 and the skateboard 84 with four screws and four nuts. The base housing 36 has various cable paths 68 which allow the steel cables to glide back and forth with ease. The base housing cover 66 in FIG. 5 encapsulates all components in the master control mechanism FIG. 6.

The brake actuator assembly FIG. 8 shows a section view B-B of FIG. 7 which illustrates its components. Initially the brake actuator assembly comprises a mounting hole 54 in the concave bracket 52 shown in FIG. 7, FIG. 8, and FIG. 9 for attachment over the kingpin 80 FIG. 2, between the hanger(axle) 78 and the baseplate 82. The concave bracket 52 is formed into the lockplate housing 62. There are two stabilizers 50 FIG. 8 and FIG. 7 formed into the support brace 48 which positions the brake actuator assembly parallel with the hanger(axle) 78. A support brace 48 FIG. 7 spans left and right surrounding the sub rotators 46 FIG. 8. Each sub rotator 46 has a cable connector 72 which is operatively coupled with a steel cable to the main rotator 26. Each sub rotator 46 is rotatably attached to the lockplate housing 62 utilizing screws and nuts. Each brake lever pad 44 is rotatably attached to the respective sub rotator 46 utilizing a metal pin(not shown). Each spring 60 keeps its respective brake lever pad 44 biased of the wheel 76 while the braking system is not in operation. FIG. 10 shows two protector covers 64 which also assists in encapsulating the components of the brake actuator assembly.

What is claimed is:

1. In a skateboard having an elongated deck, and a plurality of truck assemblies wherein each said truck assembly encompass a baseplate, a kingpin, at least one bushing, and a hanger (axle) having a pair of wheels rotatingly held at ends of axle, a braking system for said skateboard comprising; a foot control lever semi-flush mounted on the top of said deck and rotatably fastened through an opening on said deck and extending below said deck to a control lever; a main control mechanism fastened between an underside of said deck and top of said baseplate, said main control mechanism operatively coupled to said foot control lever; a brake actuator assembly affixed over said kingpin and fastened between said hanger and said baseplate, said brake actuator assembly operatively coupled to said main control mechanism whereby said foot control lever engages said main control mechanism to engage said brake actuator assembly to engage said wheels in a brake operation; and spring means for urging said braking system to a non-braking position, a disabling means to loaded button pin seated in a groove in said base housing, said button pin engages in and out of an opening in said main rotator which disables or enables operation of said braking system, said button pin employs a locking means which secures the button pin in or out of engagement with said main rotator.

2. The brake system of claim 1 wherein said foot control lever is configured with a circular foot plate that is semi-flush mounted on the top of said deck and rotatably fastened, and a cylindrical shaft is formed from the underside of said foot plate, an opening on said deck allows said shaft to extend to the underside of said deck, a control lever is secured to the bottom portion of said shaft to engage with said foot plate, said control lever is operatively coupled to a main rotator of said main control mechanism by a control cable to allow rotatable movement of said main rotator, said rotatable movement permits a plurality of cables to move a plurality of brake lever pads on said brake actuator assembly to engage towards said wheels when the user rotates said foot plate in a braking operation.

3. The braking system of claim 1, wherein said foot plate comprises a grouping of spikes formed on the top surface of foot plate of said foot control lever.

4. The braking system of claim 2 wherein a shaft of said foot control lever is fastened and extended through an opening, said opening comprises a circular hole in said skateboard deck adjacent to said main control mechanism wherein said foot control lever maybe affixed in a first orientation so that the shaft passes through the opening adjacent to the right side of said main control mechanism and maybe removed and affixed in a second orientation so that the shaft passes through the opening on the left side of main control mechanism.

5. A braking system of claim 1 wherein said main control mechanism is configured with a base housing configured to encompass a main rotator rotatably mounted, a plurality of cable connectors formed in said main rotator which is operatively coupled and engages with said foot control lever and said brake actuator assembly utilizing a cable means, a spring means urging main rotator to a non-brake applying position while disengaging said foot control lever, a plurality of cable driving paths throughout said base housing, a base housing cover which encapsulates the components of base housing of said master control mechanism, said base housing has a plurality of holes in which to fasten said master control mechanism between bottom side of said deck and top of said baseplate.

6. A braking system of claim 1 wherein a spring means urging main rotator to a non-brake applying position while disengaging said foot control lever comprises a spring brace with one end fastened to said main rotator and the other end fastened to a spring which is seated in a groove in said base housing to disengage brake operation.

7. A braking system of claim 1 wherein a locking means comprises a spring loaded locking slider bar seated in a groove in said base housing, said locking slider bar is parked unbiased in the direction of said button pin, a locking slider bar is retracted to allow button pin to engage or disengage said main rotator from movement, and a locking slider bar secures a button pin in or out of engagement with said main rotator.

8. A braking system of claim 1 wherein said foot control lever exerts a force utilizing a plurality of control cables that are connected to said main control mechanism of said brake actuator assembly.

9. A braking system of claim 5 wherein cable means comprises a cable operated brake system that operatively couples said foot control lever, said main control mechanism and said brake actuator assembly with a plurality control cables.

10. A braking system of claim 1 wherein a brake actuator assembly comprises a circular concave bracket formed in the center of a lockplate housing, said concave bracket has a central oval opening allowing said brake actuator assembly to be affixed over said kingpin and fastened between said hanger and said baseplate of said truck assembly, a pair of sub-rotators each having a cable connector, each said sub-rotator rotatably fastened to a left and a right side of said lockplate housing adjacent to said wheels, a pair of brake lever pads each pivotally affixed to respective ones of said sub-rotators, a support brace spanning across a lockplate housing wherein a support brace stabilizes said brake actuator assembly parallel to said hanger and partly enclosing each sub-rotator, a spring means affixed to each said sub-rotator urging said brake pad levers out of engagement with said wheels, a pair of protector covers fastened on a right and a left side of said lockplate housing to form an enclosure of said sub-rotators, and a cable means connecting to each sub-rotator to a main rotator of said main control mechanism.

11. The braking system of claim 10 wherein the circular concave bracket of said lockplate housing has a slightly angled base for mounting said brake actuator assembly is a predetermined position.

12. The braking system of claim 10 wherein said brake actuator assembly further comprises a spring means, said spring means comprises each said sub-rotator having a spring with one end fastened to a point on said sub-rotator and another end fastened to a point on said lockplate housing in a manner urging said brake lever pads out of engagement with said wheels when no turning force is applied on the foot plate portion of said foot control lever.

13. A braking system of claim 10 wherein cable means comprises a cable operated brake system that is operatively coupled to said foot control lever, said main control mechanism and said brake actuator assembly with a plurality control cables.

14. In a skateboard having an elongated deck, and a plurality of truck assemblies wherein each said truck assembly encompass a baseplate, a kingpin, at least one bushing, and a hanger (axle) having a pair of wheels rotatingly held at ends of axle, a braking system for said skateboard comprising; a foot control lever made of a light-weight hardened material, a main control mechanism made of a light-weight hardened material, a brake actuator assembly made of a light-weight hardened material, wherein a brake actuator assembly comprises a circular concave bracket formed in the center of a lockplate housing, said concave bracket has a central oval opening allowing said brake actuator assembly to be affixed over said kingpin and fastened between said hanger and said baseplate of said truck assembly, a pair of sub-rotators each having a cable connector, each said sub-rotator rotatably fastened to a left and a right side of said lockplate housing adjacent to said wheels, a pair of brake lever pads each pivotally affixed to respective ones of said sub-rotators, a support brace spanning across a lockplate housing wherein a support brace stabilizes said brake actuator assembly parallel to said hanger and partly enclosing each sub-rotator, a spring means affixed to each said sub-rotator urging said brake pad levers out of engagement with said wheels, a pair of protector covers fastened on a right and a left side of said lockplate housing to form an enclosure of said sub-rotators, and a cable means connecting to each sub-rotator to a main rotator of said main control mechanism.

15. The braking system of claim 14 wherein;
a foot control lever made of aluminum,
a main control mechanism made of aluminum,
a brake actuator assembly made of aluminum.

* * * * *